United States Patent
Takayasu et al.

(10) Patent No.: US 7,128,528 B2
(45) Date of Patent: Oct. 31, 2006

(54) BEARINGS FOR $CO_2$ REFRIGERANT COMPRESSOR USE, COMPRESSOR USING THE SAME, AND APPLICATIONS OF THE SAME

(75) Inventors: Hiroshi Takayasu, Tomobe (JP); Noboru Baba, Hitachiota (JP); Shouichi Nakashima, Saitama (JP); Tadashi Iizuka, Ashikaga (JP); Toshiaki Yamanaka, Ashikaga (JP); Hiroaki Ogura, Onohara (JP); Toshiomi Fukuda, Onohara (JP); Shinichi Ozaki, Takase (JP)

(73) Assignees: Hitachi, Ltd., Tokyo (JP); Toyo Tanso Co., Ltd., Osaka (JP)

( * ) Notice: Subject to any disclaimer, the term of this patent is extended or adjusted under 35 U.S.C. 154(b) by 472 days.

(21) Appl. No.: 10/419,980

(22) Filed: Apr. 22, 2003

(65) Prior Publication Data
US 2003/0231815 A1    Dec. 18, 2003

(30) Foreign Application Priority Data
Apr. 25, 2002   (JP)   .............................. 2002-123893

(51) Int. Cl.
| | |
|---|---|
| *F01D 25/08* | (2006.01) |
| *F01D 5/08* | (2006.01) |
| *F25B 1/00* | (2006.01) |
| *B32B 9/00* | (2006.01) |
| *F16C 33/02* | (2006.01) |

(52) U.S. Cl. ........................... 415/180; 415/90; 62/114; 428/408; 384/279; 418/55.1

(58) Field of Classification Search ................ 384/279, 384/510, 516, 518; 62/114, 462; 252/67; 428/408, 446, 689; 418/55.1, 55.2, 55.3, 418/55.6; 415/90, 180; 92/71
See application file for complete search history.

(56) References Cited

U.S. PATENT DOCUMENTS

| | | | |
|---|---|---|---|
| 4,396,677 A * | 8/1983 | Intrater et al. ............... 428/408 |
| 5,495,979 A | 3/1996 | Sastri et al. .............. 228/124.1 |
| 5,557,944 A * | 9/1996 | Hirano et al. ................. 62/469 |
| 5,580,834 A * | 12/1996 | Pfaff ........................... 501/90 |
| 5,690,997 A | 11/1997 | Grow ........................ 427/249 |
| 5,707,567 A * | 1/1998 | Pfaff ......................... 264/29.7 |
| 5,834,115 A | 11/1998 | Weeks, Jr. et al. ........... 428/370 |
| 6,189,322 B1 * | 2/2001 | Ishihara et al. ............... 62/114 |

FOREIGN PATENT DOCUMENTS

| | | |
|---|---|---|
| DE | 3240709 | 5/1984 |
| DE | 19642506 | 10/1997 |
| EP | 1055650 A1 | 11/2000 |
| FR | 2219133 | 9/1974 |
| JP | 02-248676 | 10/1990 |
| JP | 02-275114 | 11/1990 |

OTHER PUBLICATIONS

6001 Chemical Abstracts 116 Mar. 9, 1992, No. 10, pp. 403.

* cited by examiner

*Primary Examiner*—Richard Ridley
*Assistant Examiner*—Colby Hansen
(74) *Attorney, Agent, or Firm*—Crowell & Moring LLP

(57) ABSTRACT

The object of the present invention is to provide: high-reliability and long-life $CO_2$ refrigerant compressor-use bearings that uses bearing materials high in wear resistance and in baking resistance, and; such a compressor, air conditioner, refrigerator, and hot-water supply machine that each employ these bearings.

The $CO_2$ refrigerant compressor-use bearings according to the present invention, and the compressor, air conditioner, refrigerator, and hot-water supply machine that employ these bearings, wherein the bearings are characterized in that each bearing comprises a cylindrically shaped member whose graphite-containing carbonaceous base material has pores impregnated with tin or with one type of metal selected from the IB group or the VIII group, except iron, or with an alloy based on these metals, and in that each bearing satisfies at least one of the requirements that the bearing should comprise a carbonaceous base material containing 20 to 50 weight percent graphite, that the Shore hardness of the corresponding member should range from 65 to 120, that the compressive strength of the corresponding member should range from 200 to 500 MPa, that the porosity rate of the corresponding member should range from 0.05 to 2.00 volume percent, and that the metal or alloy contained in the corresponding member should contain at least either vanadium or titanium or both at the rate of 0.2 weight percent or less.

23 Claims, 6 Drawing Sheets

BEARINGS FOR CO₂ REFRIGERANT COMPRESSOR USE, COMPRESSOR USING THE SAME, AND APPLICATIONS OF THE SAME

BACKGROUND OF THE INVENTION

1. Field of the Invention

The present invention relates to new types of $CO_2$ refrigerant compressor-use bearings improved in wear resistance, a compressor that employs these bearings, and such an air conditioner, refrigerator, and hot-water supply machine that each employs the bearings.

2. Description of the Prior Art

Cast iron, bronze-based materials, aluminum-alloying materials, or other metallic materials, or resin-containing materials, or composite materials consisting of resin and a metal, have been employed as bearing materials for conventional refrigerant compressors. Bronze-based materials have contained a great quantity of lead. Numerous types of sliding materials laden with lead have also been most commonly used in other machines. Under these circumstances, the shafts inserted into bearings have been provided with surface treatment to prevent galling. When a bearing material other than cast iron was to be used, the occurrence of galling and unusual wear has been prevented by adopting a material dissimilar to the shaft material.

The bearing materials formed by impregnating graphite-containing carbon materials with aluminum are disclosed in Japanese Application Patent Laid-Open Publication No. Hei 02-248676 and Hei 02-275114.

In conventional compressors, increases in bearing load due to the improvement of performance have led to partial breakage of the lubricating film formed by an oil, and this event has been inciting a so-called "boundary lubrication" status under which local direct contact occurs between the bearing and the shaft. Boundary lubrication is also incited by the operational start of the compressor or the excessive ingress of the refrigerant. Under such boundary lubrication status, conventional metal-based bearings, resin-based bearings, surface-treated shafts, and the like have been prone to suffer galling or thermal seizure. Although bearing loads can be reduced by increasing the inside diameters of the bearings or increasing the length of the bearing section, these methods have had their limits since the space required for the bearings is limited in motor-containing compressors of the enclosed type.

It is known that the lead bronze and antimony alloys in which the lead or antimony having a lubricating property is contained as one of the respective components, composite materials consisting of lead or antimony and carbon, and other materials do not easily cause thermal seizure or galling. At the same time, however, there is also the fear that lead and antimony affect environments and the human body. These elements also fall under the category of the substances whose use is regulated by the pollutants release and transfer registration (PRTR) law. For lead bronze, antimony alloys, and composite materials consisting of lead or antimony and carbon, although the improvement of the respective anti-wear characteristics under an oil-free status or severe conditions is accomplished by utilizing the property that the melting point of each such metal is low. Even so, significant wear occurs to the parts used at high temperature or put into continued use under a severe sliding status.

No such conventional bearings made of carbon materials impregnated with aluminum are disclosed that employ a metal other than aluminum or that a graphite content or the porosity rate obtained after impregnation has been provided is shown.

SUMMARY OF THE INVENTION

An object of the present invention is to provide: $CO_2$ refrigerant compressor-use bearings high in both wear resistance and thermal seizure resistance and intended to prevent the occurrence of unusual wear and thermal seizure at the bearing section of a $CO_2$ refrigerant compressor that is likely not to be temporarily supplied with a lubricating oil; a compressor that employs these bearings; and such an air conditioner, refrigerator, and hot-water supply machine that each employs the bearings.

According to the present invention, it is possible to obtain $CO_2$ refrigerant compressor-use bearings in which: the graphite content in a carbonaceous base material which does not easily cause thermal seizure, even under a boundary lubrication status, is optimized for a reduced friction coefficient and improved wear resistance; the pores of the carbonaceous base material are impregnated with a metal so as to facilitate the formation of an oil film in a lubricating oil, and; the composition, structure, and content of an impregnating metal other than lead or antimony are preadjusted for a reduced friction coefficient and improved wear resistance.

It is also possible to obtain excellent sliding characteristics and hereby to obtain a $CO_2$ refrigerant compressor high in reliability.

In a $CO_2$ refrigerant compressor exposed to an oil-free status or severe bearing-sliding conditions, in order to prevent the formation of an oil film from being made difficult by the discharge of the lubricating oil through the pores left in a carbonaceous base material yielding a small friction coefficient and high wear resistance . . . even under the oil-free status or the severe bearing-sliding conditions . . . and in a graphite-containing carbonaceous base material when the bearing is used in the lubricating oil, a feature of the present invention exists in that it provides a $CO_2$ refrigerant compressor-use bearing which comprises a member whose carbonaceous base material has pores impregnated with tin or with one type of metal selected from the IB group or the VIII group, except iron, or with an alloy based on these metals, under a molten status.

It is also preferable that the content of at least either lead or antimony in each of the aforementioned metals or alloys should be 1 weight percent or less and that the Shore hardness of the corresponding member should range from 65 to 120. It is possible, by increasing the Shore hardness above 65, to maintain a small friction coefficient, while as the same time minimizing wear as well, under an oil-free status or severe bearing-sliding conditions, and thereby to provide a highly reliable and long-life $CO_2$ refrigerant compressor. In addition, in view of mass productivity, since a Shore hardness exceeding 90 deteriorates machinability, a $CO_2$ refrigerant compressor-use bearing high in both wear resistance and productivity can be provided by controlling the Shore hardness to 90 or less.

In the prevent invention, the content of lead or antimony should be controlled to 0.5 weight percent or less, preferably to 0 weight percent, and it is also preferable for productivity that JIS-specified materials should be used. In addition, it is preferable that the compressive strength of the member should be from 200 to 500 MPa. It is possible, by increasing the compressive strength above 200 MPa, to maintain a small friction coefficient, while as the same time minimizing wear as well, under an oil-free status or severe bearing-sliding conditions, and thereby to provide a highly reliable and long-life bearing for $CO_2$ refrigerant compressor use. Furthermore, since compressive strength greater than 500 MPa deteriorates machinability, it is preferable that in view of mass productivity, compressive strength should not exceed 500 MPa.

In the present invention, the pores in the bearing material are controlled to their minimum, even when lubrication is occurring smoothly under the steady operational status of the refrigerant compressor. More specifically, it is possible to stably form a lubricating oil film, and to suppress wear, by controlling to 0.05–2.00 volume percent, preferably to 0.5–1.5 volume percent, the porosity rate of the metal- or alloy-impregnated and graphite-containing carbonaceous base material used as the bearing material, and thereby to obtain a long-life bearing for $CO_2$ refrigerant compressor use. It is also preferable that the carbonaceous base material be impregnated with a metal so as to obtain a porosity rate of 0.05–2.00 volume percent by controlling the porosity rate of the carbonaceous base material to 5–15 volume percent prior to impregnation.

In the present invention, the bearing is characterized in that it comprises a bearing material containing at least either lead or antimony of 1 weight percent or less in the pores of a carbonaceous base material laden with 20–50 weight percent graphite, and impregnated with the above-mentioned alloy or metal other than lead or antimony.

In the present invention, since it is also possible to create carbides (VC, TiC) of vanadium or titanium by adding at least either vanadium or titanium of 2 weight percent or less, preferably, 0.05 to 0.15 weight percent, to the above-mentioned metal or alloy, and to fully charge the pores of the carbonaceous base material with an impregnating metal by improving wettability with respect to the carbonaceous base material, the porosity rate is reduced and an even more stable lubricating oil film can be formed. Consequently, wear can be suppressed and a highly reliable $CO_2$ refrigerant compressor can be obtained.

It is possible, by controlling the melting point of the impregnation source metal or alloy with respect to the carbonaceous base material to, in the case of copper or its alloy, at least 900° C., preferably, 900 to 1200° C., further preferably, 950 to 1050° C., to maintain lubrication characteristics and wear resistance and enhance the reliability of the refrigerant compressor, even if temperature increases under a continued severe sliding status.

The IB group consists of copper, silver, and gold, and the VIII group consists of cobalt, nickel, ruthenium, rhodium, palladium, osmium, iridium, and platinum. However, copper, silver, cobalt, and nickel are preferable. Also, alloys containing, in terms of weight ratio, 80–90% copper, 5–11% tin, up to 3% zinc, and at up to 1.0% lead, preferably, up to 5% lead, are preferable. In addition, it is preferable that the foregoing alloys be tin alloys containing 0.5–5.0% copper and 25–30% zinc in terms of weight ratio. These metals or alloys elude the formation of compounds, are high in wear resistance and in thermal seizure resistance, and facilitate impregnation.

Since pores are present in the carbonaceous base material, the lubricating oil flows into the pores and hereby the oil film is lost, the carbonaceous base material is impregnated with copper to minimize the effects on environments and the human body. The section impregnated with copper alone is too soft and friction makes the copper section prone to fusion. In order to avoid fusion, and even, unusual wear, therefore, the strength of the copper section can be improved by adding alloying elements. By avoiding fusion, the friction coefficient can be reduced, even under a boundary lubrication status, and by using this material for the bearing, a highly reliable $CO_2$ refrigerant compressor can be obtained.

It is understood that the graphite contained in a carbonaceous base material reduces the friction coefficient by thinning-down due to friction. However, too high a graphite content at high load softens the carbonaceous base material itself and the resulting increase in deformation resistance augments friction. At the same time, wear also increases. Therefore, a graphite content of 50 weight percent or less, preferably, 35 weight percent or less, is appropriate. Conversely, a graphite content less than 20 weight percent hardens the carbonaceous base material and abrades the metallic material that undergoes friction. For these reasons, it is possible, by controlling the graphite content to 20–50%, preferably, 20–35%, to obtain a bearing low in friction coefficient and high in wear resistance and hereby to provide a highly reliable $CO_2$ refrigerant compressor.

The bearing-manufacturing method according to the present invention is by impregnating a carbonaceous base material of a baked block shape, with a metal, and then cutting this base material into a bearing shape. In this case, if the amount of cutting is too great and the Shore hardness, in particular, of the carbonaceous base material is too high, the life of the cutting tool will decrease and this will lead to more frequent tool changing and hereby to increased costs. For these reasons, the desired bearing needs to be manufactured by first manufacturing, from the beginning, a carbon base material into a shape close to the final bearing shape by near-net shaping, then impregnating the thus-produced carbonaceous base material with a metal, and reducing the amount of cutting required. A $CO_2$ refrigerant compressor high in productivity can be obtained by manufacturing the bearing in this way.

The present invention consists in a bearing for a $CO_2$ compressor which uses a $CO_2$ refrigerant not containing chlorine, and since the friction-reducing action, in particular, of the refrigerant itself is small and thus since boundary lubrication is prone to occur, a highly reliable $CO_2$ refrigerant compressor can be obtained by employing the bearing which has, even under boundary lubrication, low enough friction characteristics and sufficient wear resistance.

The present invention is characterized in that in a $CO_2$ refrigerant compressor for compressing a $CO_2$ refrigerant by using a compression means driven by the rotation of a rotary shaft, the bearing section for supporting the foregoing rotary shaft consists of the foregoing bearing for a $CO_2$ refrigerant compressor.

It is preferable that the aforementioned compression means should further comprise an intermediate-pressure compression means, which applies an intermediate pressure created by a roller eccentrically rotated inside a cylinder by the rotation of said rotary shaft, and a high-pressure compression means, which creates a high pressure from the intermediate pressure given by the roller eccentrically rotated inside the cylinder by the rotation of the rotary shaft, that the above-mentioned intermediate-pressure compression means and high-pressure compression means should be arranged in a vertical direction with respect to said rotary shaft, that a separating member equipped with said bearing and a frame also equipped with said bearing should be provided between the two compression means so as to take a sandwiched arrangement, and that both bearings should be formed into a single assembly by press-fitting.

Also, the aforementioned compression means is characterized in that it is equipped with a fixed scroll and a rotary scroll which is disposed so as to face the fixed scroll and driven by the rotation of the aforementioned rotary shaft. It is preferable that the aforementioned rotary shaft be supported by the frame having the above-mentioned bearings, that the fixed scroll be equipped with the foregoing bearing fixed to the recess of the scroll, and that both bearings be formed into a single assembly by press-fitting.

The present invention consists in such an air conditioner, refrigerator, and hot-water supply machine that each employs the $CO_2$ refrigerant compressor mentioned above.

As described above, according to the present invention, it is possible, by using a highly wear-resistant material for the bearing section of a high-pressure $CO_2$ refrigerant compressor in which a lubricating oil is likely to be difficult to supply or not to be temporarily supplied, to prevent the occurrence of unusual wear and thermal seizure and thus significantly enhance total compressor reliability. Because of their applicability even to an abrupt lubrication shortage, these bearings are also extremely useful for improving the reliability of an air conditioner, a refrigerator, and a hot-water supply machine. In addition, the machinability of these bearings by near-net shaping enables the enhancement of productivity.

DESCRIPTION OF THE PREFERRED EMBODINMENTS (Embodiments 1 to 12)

The bearings pertaining to the present invention can be obtained by immersing such a cylindrical body made of a graphite-containing carbonaceous base material as near-net-shaped into a cylindrical shape close to the final bearing shape beforehand, in the molten hot water obtained by heating, in a vacuum furnace, a metal- or alloy-charged crucible to a temperature 100° C. higher than the melting temperature of the metal or alloy, and then providing impregnation under a nitrogen gas pressure. After the impregnation, bearings of this type are each cut into a cylindrical shape, and this cutting process is such that it can be performed simply by cutting almost the metal-impregnated section.

Figure 2:
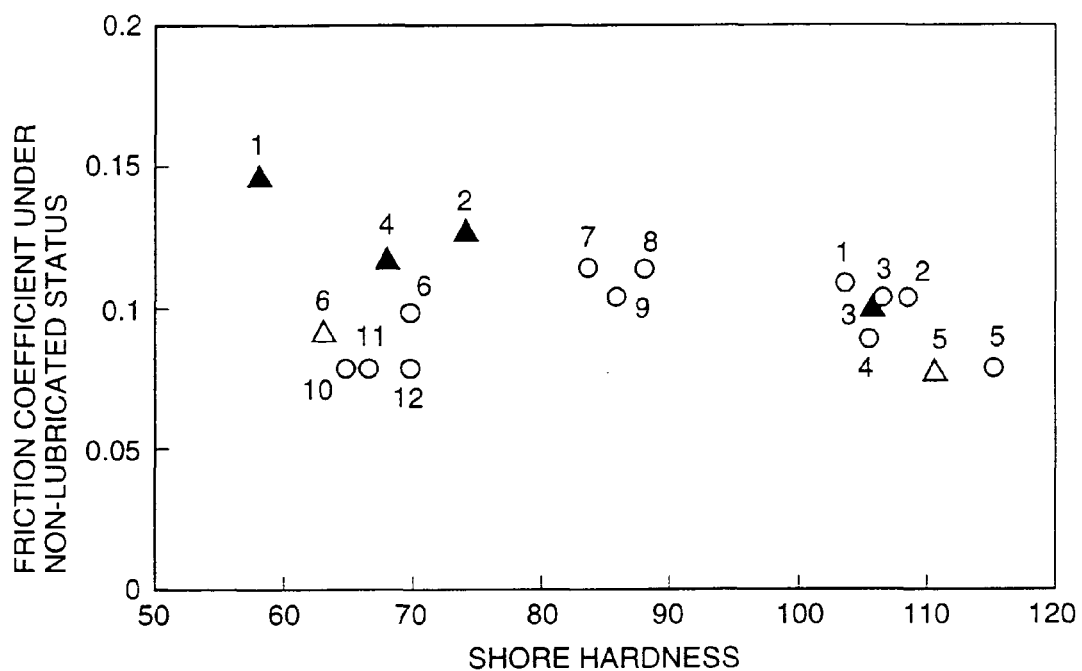
FIG. 2 is a diagram showing the relationship between the Shore hardness of each bearing material according to the present invention, and the friction coefficients existing under an oil-free status.

Table 1 shows the relationship between comparative examples and embodiments in terms of Shore hardness, and FIG. 2 shows the relationship between the Shore hardness of each bearing material in the present invention and the friction coefficients existing under an oil-free status, in a carbonaceous base material and the system of materials obtained by impregnating the carbonaceous base material with metals. The triangle marks in FIG. 2 denote comparative examples, and the black-masked marks in the figure denote the bearing materials made only of the carbonaceous base material mentioned above. Circle marks denote embodiments of the present invention. Numerals are the identification numbers of the embodiments, and these numbers are the same as those of Table 1. With a refrigerant compressor in view, oil-free status evaluations have been conducted under a $CO_2$ gas atmosphere. It can be seen that the friction coefficient under the oil-free status of the bearing material decreases with increases in Shore hardness. Bronze (BC3) contains 10% tin, 2% zinc, and 0.2% lead, in terms of weight ratio, and the remainder is copper. Five types of white metals (WJ5) each contain 2% copper and 29% zinc in terms of weight ratio, and the remainder is tin. As shown in FIG. 2, bronze-impregnated materials decrease in friction coefficient as the Shore hardness of each increases above 65, preferably, above 80. Similarly, materials impregnated with WJ5 are small in friction coefficient.

The porosity rates existing before the carbonaceous base material was provided with impregnation are, in terms of volume ratio, 11% in the case of comparative example 4 and 10.3% in the case of comparative example 1. Also, the after-impregnation porosity rates are, in terms of volume ratio, 1.3% in the case of comparative example 1, 0.4% in the case of comparative example 2, 0.3% in the case of comparative example 3, 1.5% in the case of comparative example 4, and 0.7% in the case of comparative example 5. The graphite content in the carbonaceous base material is, in terms of weight ratio, 35% in the case of comparative examples 1 to 5 or 42% in the case of comparative examples 6 to 9. The porosity rates and graphite content obtained before and after the impregnation in the case of embodiments 10 to 12 are almost the same as those of embodiments 1 to 9.

TABLE 1

| Item | No. | Impregnating metal | Shore hardness |
|---|---|---|---|
| Comparative example | 1 | None | 58 |
| | 2 | None | 74 |
| | 3 | None | 105 |
| | 4 | None | 68 |
| | 5 | Sb | 110 |
| | 6 | Pb | 63 |
| Embodiment | 1 | Bronze | 103 |
| | 2 | Bronze + V | 108 |
| | 3 | Bronze + Ti | 106 |
| | 4 | Sn | 105 |
| | 5 | Cu | 115 |
| | 6 | Sn | 70 |
| | 7 | Bronze | 84 |
| | 8 | Bronze + V | 88 |
| | 9 | Bronze + Ti | 86 |
| | 10 | WJ5 | 65 |
| | 11 | WJ5 + V | 67 |

Figure 6:
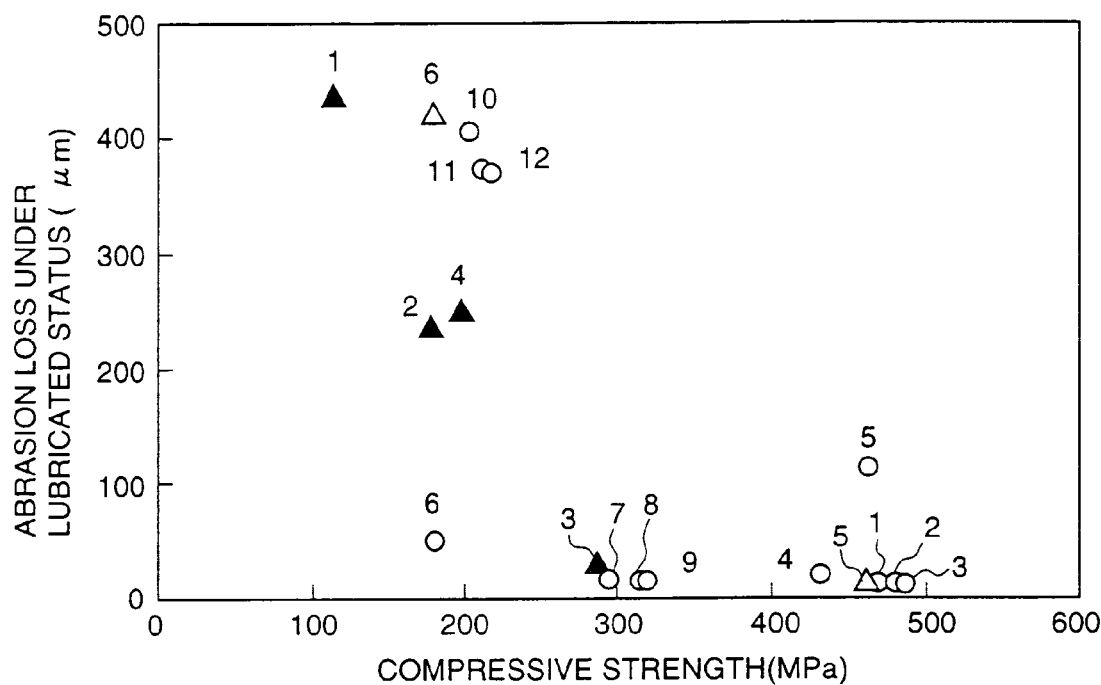
FIG. 6 is a diagram showing the relationship between compressive strength and the abrasion loss measured after withstand load tests.

The hardness of the non-impregnated bearing materials in the comparative examples differ according to porosity rate, graphite content, pitch content, tar content, and other factors. As shown in FIG. 6, the porosity rates of these bearing materials range from 6% to 11%, and as the porosity rate increases, hardness decreases.

Figure 3:
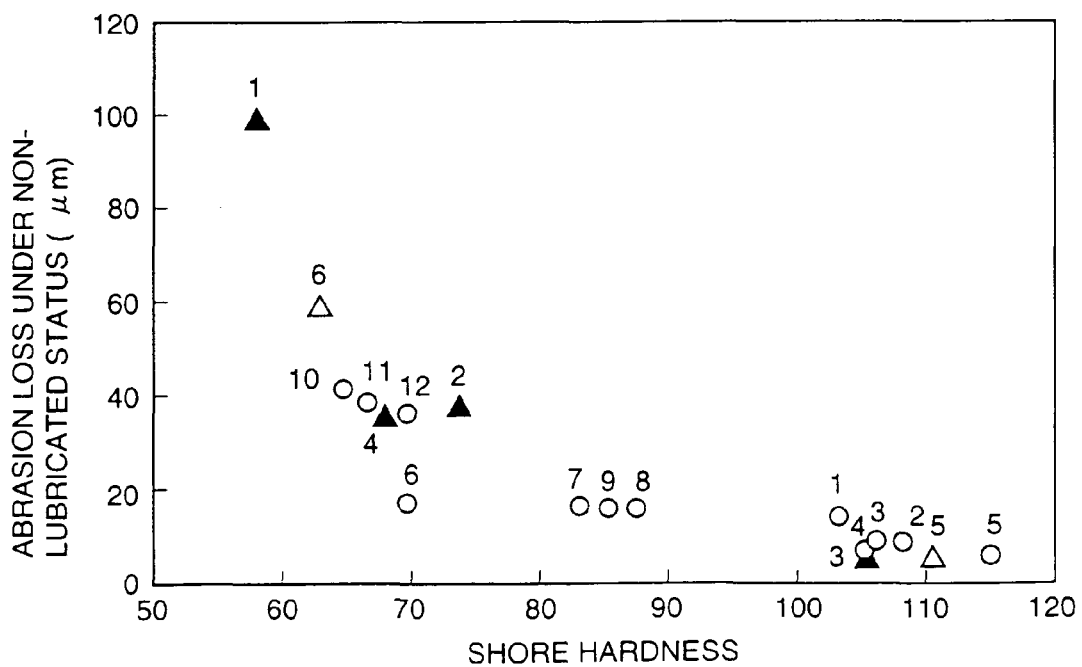
FIG. 3 is a diagram showing the relationship between the Shore hardness existing under an oil-free status, and the abrasion loss of a fixed test piece.

FIG. 3 is a diagram showing the relationship between the Shore hardness existing under an oil-free status, and the abrasion loss of a fixed test piece. Wear tests have been conducted using a high-pressure-atmosphere wear-testing machine, and during these tests, a carbonaceous base material (measuring 10 mm×10 mm×36 mm) and cemented and quenched structural steel material SCM415 have been used as a fixed test piece and a movable test piece, respectively. The tests have been performed for 10 hours at a surface pressure of 9.8 MPa, a sliding speed of 1.2 m/sec, and under a $CO_2$ refrigerant atmosphere, and then the abrasion loss of each tested material has been measured. It can be seen that as the hardness of the bearing material increases, the abrasion loss thereof decreases. It can also been seen from FIG. 3 that as the Shore hardness of the bearing material increases above 65, preferably, above 80, the abrasion loss thereof decreases.

Figure 4:
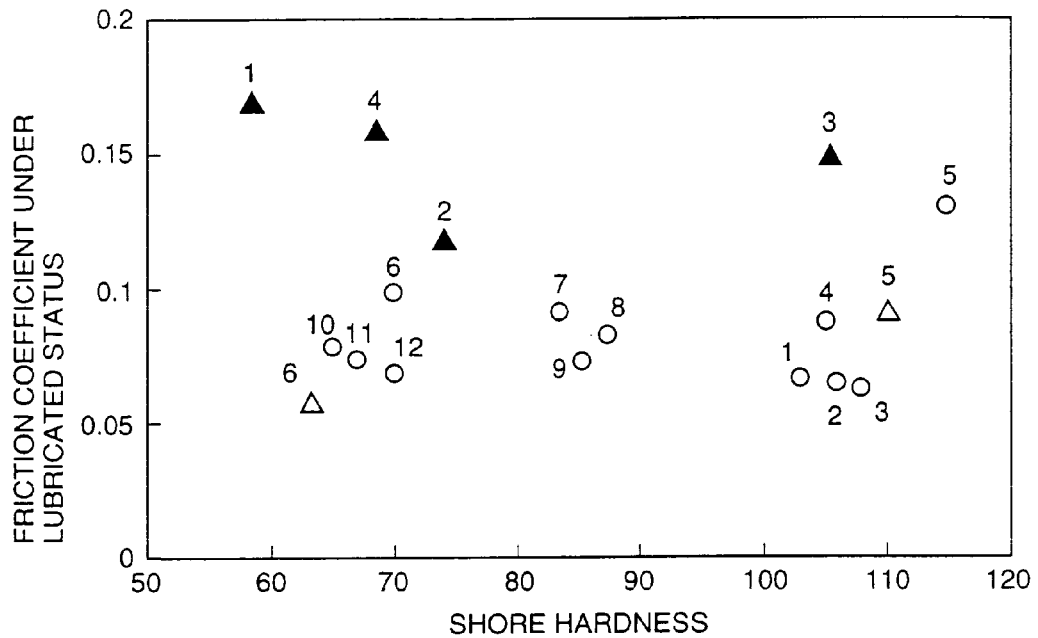
FIG. 4 is a diagram showing the relationship between Shore hardness and the friction coefficient existing under a lubricating oil atmosphere.

FIG. 4 is a diagram showing the relationship between Shore hardness and the friction coefficient existing under a lubricating oil atmosphere. As Shore hardness increases above 65, preferably, above 80, the friction coefficient of the bearing material decreases. Embodiment 1 uses bronze (BC3) as the impregnating metal, and in this case, the friction coefficient under a lubricating oil atmosphere is low. Also, as in embodiments 2 and 3, as 0.1% titanium or vanadium is added to the alloy used as the impregnating metal, the porosity rate decreases and this improves oil film retentivity and further reduces the friction coefficient.

In comparative examples 2, 3, and 4, each of which employs a metal as the impregnating material, the friction coefficient is as high as over 0.1, despite a Shore hardness of 65 or more. This state is not preferable since the carbon base material is porous and since the possible shortage of the oil during sliding under a lubricating oil atmosphere thins down the oil film and results in mixed lubrication. In addition, although low in friction coefficient, comparative example 6 is not preferable for environmental reasons since lead is used in the impregnating material. In comparative examples 1, 2, and 4 to 12, each of which employs a metal as the impregnating material, when Shore hardness is from 65 to 110, the friction coefficient is as low as less than 0.1.

Figure 5:
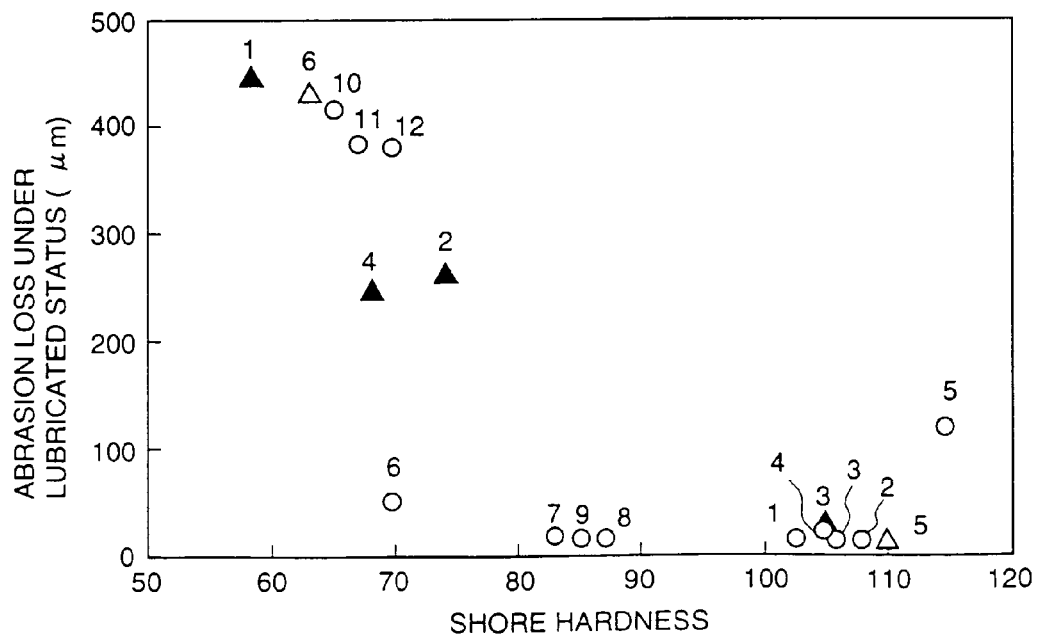
FIG. 5 is a diagram showing the relationship between Shore hardness and the abrasion loss measured after withstand load tests.

FIG. 5 is a diagram showing the relationship between Shore hardness and the abrasion loss measured after completion of the withstand load tests which have been performed at a load rate of 0.15 MPa/sec, a sliding speed of 1.2 m/sec, and surface pressures up to 98 MPa, under the mixed lubrication status created by adding a synthetic oil to the $CO_2$ refrigerant. The bearing materials that use bronze (BC3) are small in friction coefficient when the respective Shore hardness values are 65 or more, preferably, 80 or more. Embodiment 1 uses bronze (BC3) as the impregnating metal, and the bearing material in this case is the smallest of all embodiments in terms of abrasion loss under a lubricating oil atmosphere. It has been found, therefore, that materials higher in Shore hardness are better suited as bearing materials. Also, as in embodiments 2 and 3, as 0.1% titanium or vanadium is added to the alloy used as the impregnating metal, the porosity rate decreases and this improves oil film retentivity and further reduces the friction coefficient.

FIG. 6 is a diagram showing the relationship between compressive strength and the abrasion loss measured after completion of the withstand load tests which have been performed at a load rate of 0.15 MPa/sec, a sliding speed of 1.2 m/sec, and surface pressures up to 98 MPa, under the mixed lubrication status created by adding a synthetic oil to the $CO_2$ refrigerant. The bearing materials that use bronze (BC3) are small in friction coefficient when compressive strength is 30 or more. Embodiment 1 uses bronze (BC3) as the impregnating metal, and the bearing material in this case is the smallest of all embodiments in terms of abrasion loss under a lubricating oil atmosphere. It has been found, therefore, that materials higher in compressive strength are better suited as bearing materials. Also, as in embodiments 2 and 3, as 0.1% titanium or vanadium is added to the alloy used as the impregnating metal, the porosity rate decreases and this improves oil film retentivity and further reduces the friction coefficient.

Figure 7:
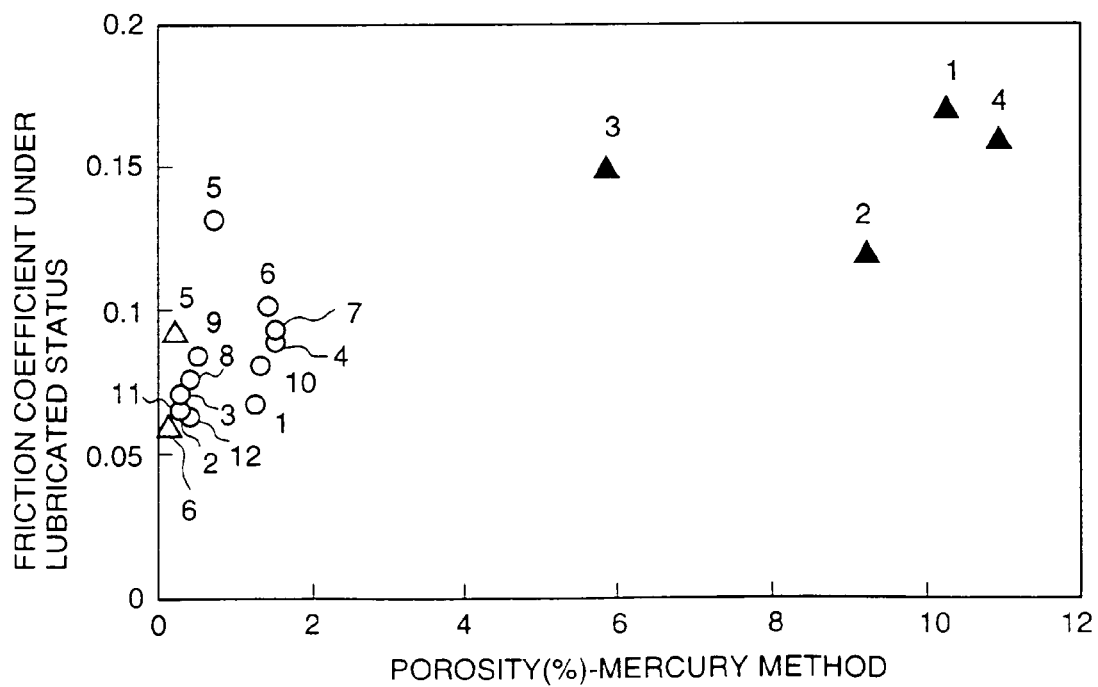
FIG. 7 is a diagram showing the relationship between the porosity rates of bearing materials, and the friction coefficients of these bearing materials existing under a lubricating oil atmosphere.

FIG. 7 is a diagram showing the relationship between the residual porosity rates in bearing materials, and the friction coefficients that have been measured during severe friction tests under a lubricating oil atmosphere. A synthetic oil matching the $CO_2$ refrigerant has been used as the lubricating oil. The porosity rates have been measured using the Model-2000 porosimeter manufactured by FISONS (AMCO). The porosity rates have been calculated from [(Cumulative pore volume)×(Bulk density)×100(%)] by use of the pore distribution curve sampled with the above method. It can be confirmed that as the porosity rate decreases, the retentivity of the oil film improves and the friction coefficient under a lubricating oil atmosphere decreases. Embodiments 2, 3, 8, and 9, in each of which an alloy with vanadium or titanium added to bronze is employed as the impregnating material, create carbides (VC, TiC) of vanadium or titanium during impregnation and improve wettability with respect to the carbonaceous base material. Consequently, compared with embodiments 1 and 4, in which vanadium or titanium is not added, embodiments 2, 3, 8, and 9 reduce the porosity rate, improves the retentivity of the oil film under a lubricating oil atmosphere, and reduce the friction coefficient. The surface of the carbonaceous base material impregnated with the alloy having added vanadium or titanium added has been observed through a scanning-type electron microscope to find that the carbides (VC, TiC) of vanadium or titanium exist at the boundary between the carbonaceous base material and the alloy.

Figure 8:
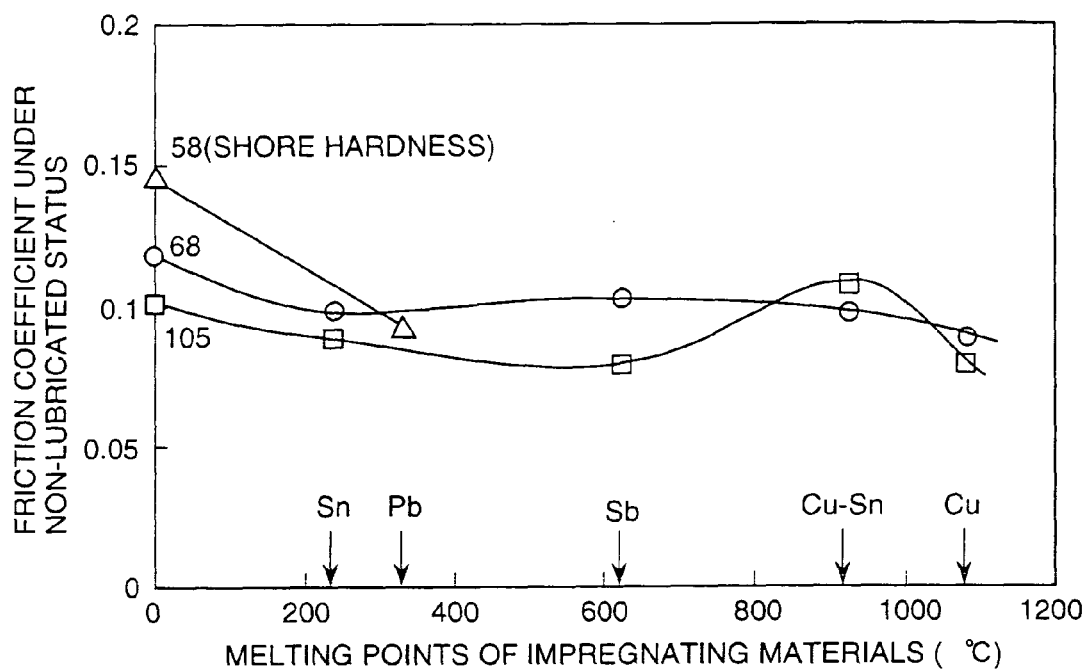
FIG. 8 is a diagram showing the relationship between the melting points and the friction coefficients of impregnating materials.

FIG. 8 is a diagram showing study results on the relationship between the melting points of impregnating metals and the friction coefficients existing under an oil-free status, that is to say, the severest lubricating conditions. The numerals in the figure denote the Shore hardness values of the carbonaceous base materials existing before they were impregnated with each metal. Although the hardness of the carbonaceous base material before being impregnated differs according to the type of impregnating metal, the tendencies of friction coefficients due to the difference in the type of impregnating metal are almost the same. As shown in FIG. 8, lead and antimony are metals as low as about 200 to 400° C. in melting point, and a friction coefficient reduction effect has been confirmed in these metals. It has also been found that the copper and copper alloy whose melting points were conditioned above 900° C. yield much the same friction coefficients as those of the above-mentioned metals low in melting point.

Although copper has been used as a material high in melting point, if impregnation with other high-melting-point metals is possible, high wear resistance and low friction can be achieved by combination with a carbonaceous base material. These embodiments have adopted a method of metal impregnation by, as the impregnation process, immersing a carbonaceous base material in a molten metal while at the same time, applying pressure. In this process, reducing the melting point to its minimum is originally valid for improving productivity. Therefore, the melting point has been slightly reduced by adding tin to copper to manufacture the bearing material. The use of an alloy in the impregnating metal improves the strength of the impregnating metal itself, and this is also effective for improving the hardness of the entire bearing material. In addition, adding to the impregnating metal an element which improves cutting characteristics gives a smoother and better finish to the friction surface of the bearing material, hereby enabling a more reliable bearing to be constructed.

Figure 9:
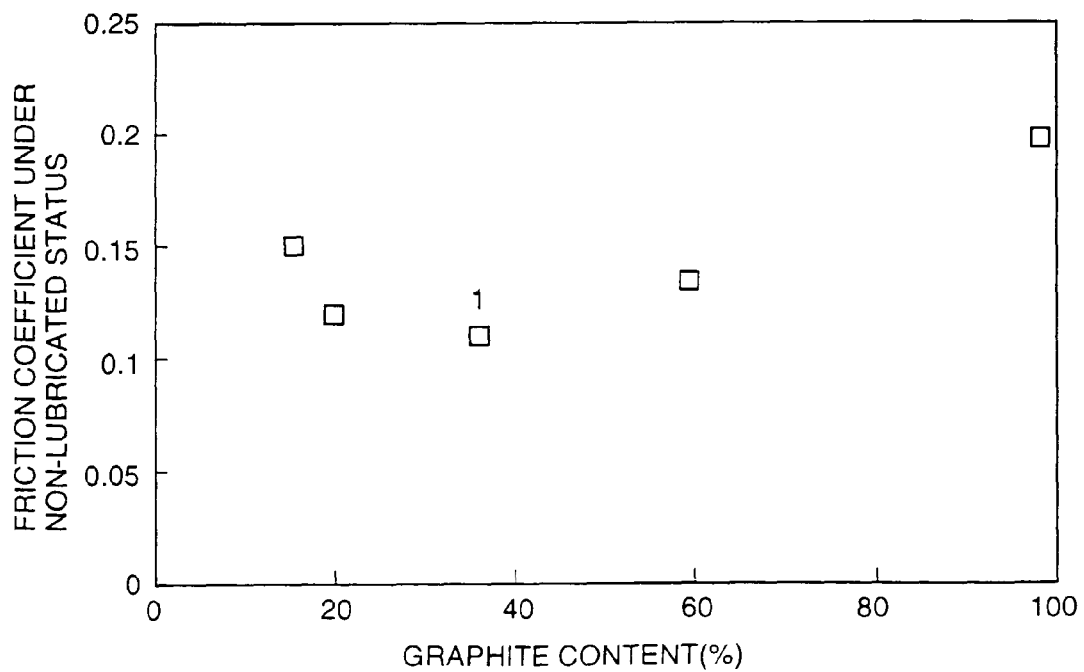
FIG. 9 is a diagram showing the relationship between graphite content data and oil-free friction coefficient data.

FIG. 9 is a diagram showing the relationship between the graphite content data and oil-free friction coefficient data relating to each bearing material that was formed by baking a graphite-containing carbonaceous base material and then impregnating it with bronze (BC3) or copper. Data No. 1 relates to embodiment 1, and data without a number is added data. As shown in FIG. 9, the minimal friction coefficient is obtained when the graphite content ranges from 20 to 50 weight percent, especially, from 20 to 40 weight percent.

(Embodiment 13)

Figure 1:
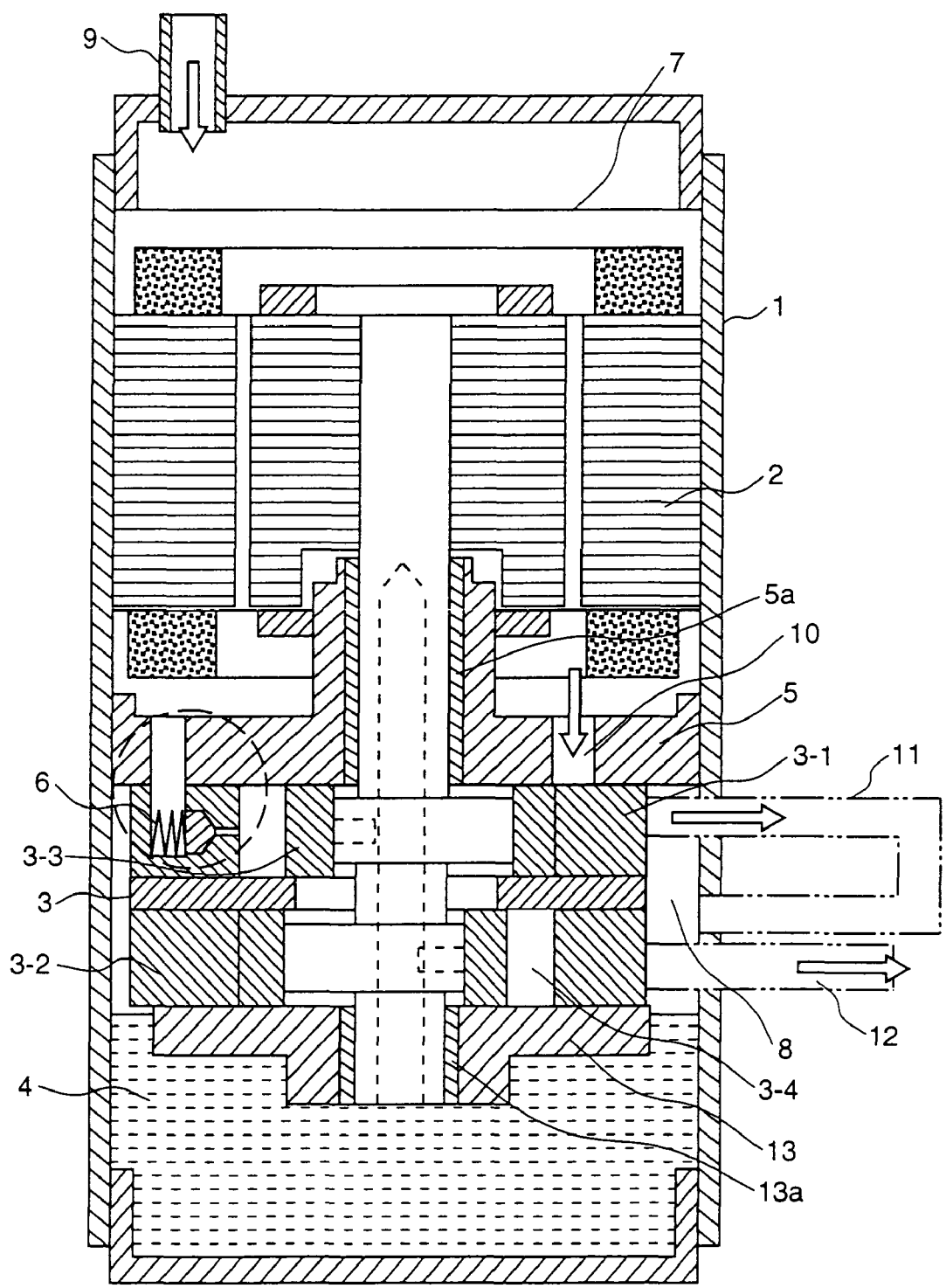
FIG. 1 is a cross-sectional view of the two-stage compressor pertaining to the present invention.

FIG. 1 is a cross-sectional view of a two-stage compressor which uses the plurality of $CO_2$ refrigerant compressor-use bearings pertaining to embodiments 1 to 12 of the present invention. Cylinders 3-1 and 3-2 and rollers 3-3 and 3-4 are accommodated in an enclosed vessel 1 to constitute an electric driving element 2 and a compression element 3, respectively, and a refrigerator oil 4 is further stored at bottom. The inside of the enclosed vessel 1 is divided into an upper space 7, which includes the electric driving element 2, and a lower space 8, which includes the compression element 3 and the refrigerator oil 4, by a separating member 5. The refrigerant gas, after being inducted from a suction pipe 9 into the upper space 7 under a low-pressure status, is taken in from a suction port 10 to the cylinder 3-1, where the gas is then compressed and delivered to the lower space 8 under an intermediate-pressure status. The refrigerant that has been further compressed from the intermediate pressure to a high pressure by the second cylinder 3-2 is delivered from a discharge pipe 12 to a cycle. 11 is discharge pipes.

The separating member 5 (also functioning as the main bearing) and a frame 13 are made of cast iron, the above-mentioned bearings 5c and 13a according to the present invention are integrated into independent single assemblies by press-fitting, and the lubricating oil to be circulated is supplied to both assemblies. During the start of the compressor and when the discharging pressure of the refrigerant is too high, the insufficiency in the amount of supply of the lubricating oil is prone to result in damage due to unusual wear or thermal seizure. However, since the cylindrical bearings in the present invention are fixed by being press-fit into the through-hole of the separating member 5 or the recess of the frame, the reliability and durability of the two-stage compressor can be improved. 5a is bearing and 6 is pressure-regulating valve.

As is obvious from embodiments 1 to 12 described above, the bearings in the present invention have been applied to the separating member 5 and frame 13 of the two-stage compressor in FIG. 1, and as a result, wear resistance and life against the $CO_2$ refrigerant have been achievable at a level equivalent to, or higher than, that obtainable by using a conventional composite material based on a carbonaceous base material simply impregnated with lead or antimony.

(Embodiment 14)

Figure 10:
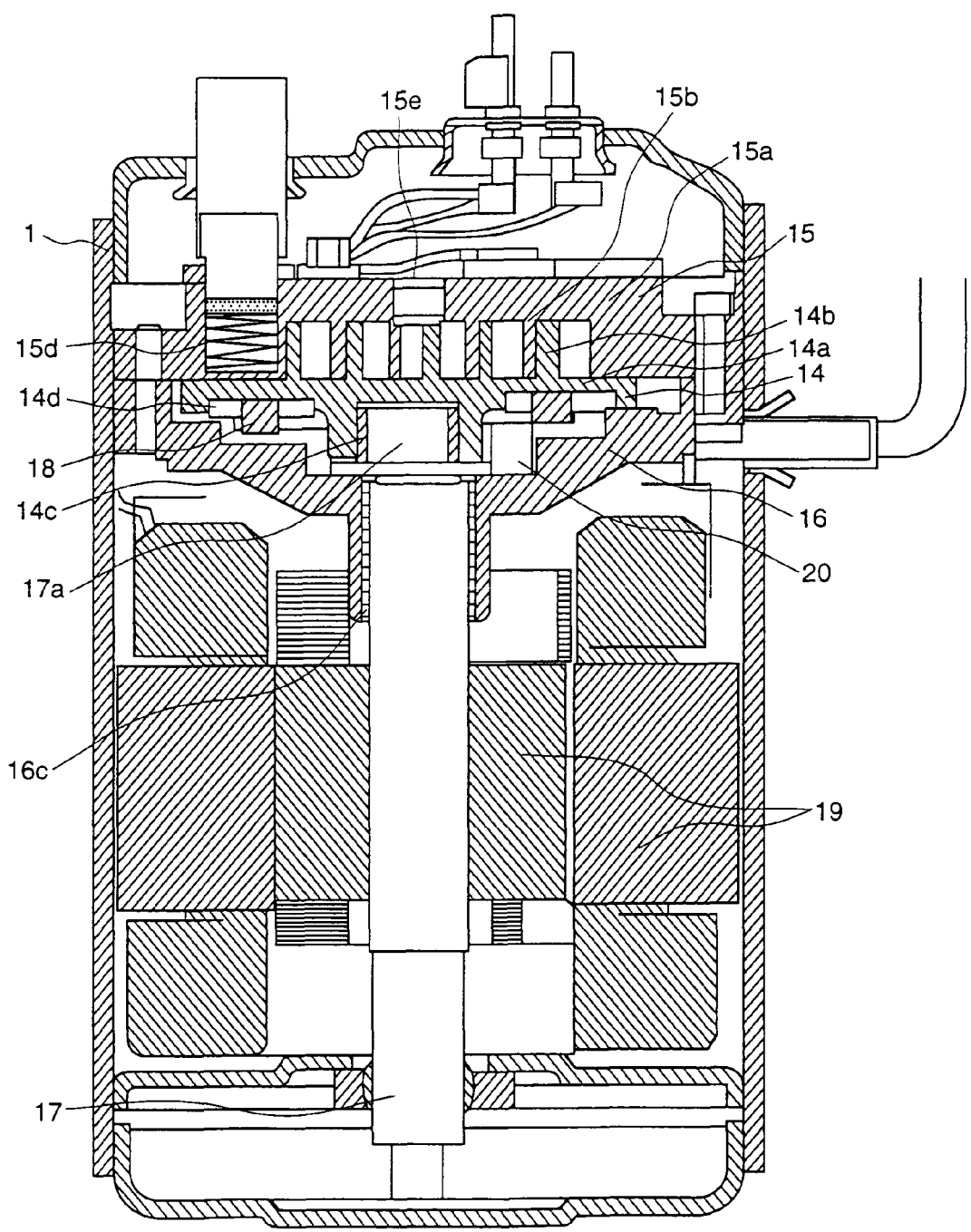
FIG. 10 is a cross-sectional view of the $CO_2$ refrigerant scroll compressor pertaining to the present invention.

FIG. 10 is a cross-sectional view of a $CO_2$ refrigerant scroll compressor which uses the plurality of $CO_2$ refrigerant compressor-use bearings pertaining to the present invention. The rotary bearing 14c of a base plate 14a and the bearing 16a of a frame 16 are press-fit bearings whose carbonaceous base materials set forth in embodiments 1 to 10 of the present invention are impregnated with a metal. The scroll compressor has a compression mechanism above and a motor 19 below inside an enclosed vessel 1, and the compression mechanism and the motor are provided in connected form via a crankshaft 17. At the compressor section, a scroll member 15 having spiral laps 15b positioned upright on a base plate 15a, and a rotary scroll member 14 having spiral laps 14b positioned upright on a base plate 14a are arranged by meshing the laps 14b with each other, and a suction hole 15d and a discharge hole 15e are arranged at the outer surface section and center section, respectively, of a fixed scroll member 15.

The crankshaft 17 is supported by a bearing 16c provided in the center of the frame 16, and a crank 17a projecting over the leading end of the crankshaft 17 is inserted into and engaged with the rotary bearing 14c of the rotary scroll member 14. The Oldham's coupling 18 as an auto-rotation preventing member, functions for the rotary scroll member 14 to pivot with respect to the fixed scroll member 15 without autonomously rotating, and this coupling is engaged between the rear keyway 14b in the base plate 14a of the rotary scroll member 14 and the keyway in the mounting base plate of the frame 16. At this engaged section of the coupling, when the crankshaft 17 is rotated by the motor 19 located below the coupling, the eccentric rotation of the crankshaft 17 activates the rotary scroll member 14 to start pivoting with respect to the fixed scroll member 15 without autonomously rotating, thereby the refrigerant gas that has been taken in from the suction hole 15d is compressed, and then the compressed gas is discharged from the discharge hole 15e.

The rotary bearing 14c and the bearing 16c are provided on the base plate 14a and the frame 16, respectively, and the lubricating oil to be circulated is supplied to both bearings. However, during the start of the compressor and when the discharging pressure of the refrigerant is too high, the insufficiency in the amount of supply of the lubricating oil is prone to result in damage due to unusual wear or thermal seizure. However, since the cylindrical bearings according to the present invention are fixed by being press-fit into the recess of the base plate 14a and the through-hole of the frame 16, the reliability and durability of the scroll compressor can be improved. Accordingly, the bearings according to the present invention are formed into integrated assemblies at the base plate 14a and the frame 16, and these assemblies are constituted using the aluminum-based alloys that contain 5–15 weight percent cast iron or silicon. 14d is rear keyway and 20 is balancing weight.

The bearings pertaining to the present invention are the same according to embodiments 1 to 12 described above. This scroll compressor when applied to a hot-water supply machine has been evaluated assuming winter use. Even in the presence of a high-pressure atmosphere and under the severe conditions that concentrate the $CO_2$ refrigerant in the compressor and reduce the concentration of the lubricating oil, favorable results without operational stoppage of the compressor due to the galling of the bearing section or the deterioration of performance due to unusual wear, have been obtained.

(Embodiment 15)

The bearing materials described in embodiments 1 to 12 of the present invention have been applied to a reciprocating type of $CO_2$ refrigerant compressor. Resultingly, even when the amount of lubricating oil to be charged into the refrigeration cycle was reduced to a quarter of the normal value, there has been no inferiority in the action of compressing the refrigerant. It can therefore be judged that when used under normal operating conditions, these bearings have improved the reliability of the reciprocating compressor.

Under the atmosphere of the refrigeration cycle, a dissolved refrigerant is present in the lubricating oil. The dissolution rate of the refrigerant depends on the particular combination of the refrigerant and the lubricating oil. Usually, however, as pressure increases, the dissolution rate also increases. Since the viscosity of the lubricating oil decreases with increases in the dissolution rate, frictional sliding becomes severe under a high-pressure atmosphere. The lubricating oil supplied to the sliding sections, especially, bearings of the refrigerant compressor is stored therein and supplied to the sliding sections by use of various methods. Therefore, since the bearing materials according to the present invention are not affected by restrictions on sliding conditions due to any differences in the dissolved status of the refrigerant in the lubricating oil, these bearings have been applicable in a wide range.

What is claimed is:

1. A $CO_2$ refrigerant compressor for compressing a $CO_2$ refrigerant, comprising a compression device driven by a bearing-supported rotary shaft, wherein said compression device includes an intermediate-pressure compression device which applies an intermediate pressure created by a roller eccentrically rotated inside a cylinder by the rotation of said rotary shaft, and a high-pressure compression means which creates a high pressure from the intermediate pressure given by the roller eccentrically rotated inside the cylinder by the rotation of the rotary shaft, and wherein a bearing supporting the rotary shaft comprises a cylindrically-shaped member whose graphite-containing carbonaceous base material has pores impregnated with tin or with one type of metal selected from the IB group or the VIII group, except iron, or with an alloy based on these metals.

2. A $CO_2$ refrigerant compressor according to claim 1, wherein said member's Shore hardness ranges from 65 to 120.

3. A $CO_2$ refrigerant compressor according to claim 1, wherein said member's compressive strength ranges from 200 to 500 MPa.

4. A $CO_2$ refrigerant compressor according to claim 1, wherein said member's porosity rate ranges from 0.05 to 2.00 volume percent.

5. A $CO_2$ refrigerant compressor according to claim 1, wherein said bearing comprises an alloy containing at least either vanadium or titanium at the rate of 0.2 weight percent or less in either of said metals or in the alloy itself.

6. A $CO_2$ refrigerant compressor according to claim 1, wherein said alloy or either of said metals contains at least either lead or antimony at the rate of 1 weight percent or less.

7. A $CO_2$ refrigerant compressor according to claim 1, wherein said alloy is a copper alloy containing 80–90 weight percent copper, 5–11 weight percent tin, up to 3 weight percent zinc, and up to 1.0 weight percent lead.

8. A $CO_2$ refrigerant compressor according to claim 1, wherein said alloy is a tin alloy containing copper and zinc at rates from 0.5 to 5.0 weight percent and 25 to 35 weight percent, respectively.

9. A $CO_2$ refrigerant compressor according to claim 1, wherein said carbonaceous base material is in its final shape.

10. A $CO_2$ refrigerant compressor according to claim 1, wherein said intermediate-pressure compression device and high-pressure compression device are arranged in a vertical direction with respect to said rotary shaft, a separating member including a bearing and a frame including a bearing are provided between the compression devices in a sandwiched arrangement, and the separating member and frame bearings are formed into a single assembly by press-fitting.

11. An air conditioner characterized in that it employs the $CO_2$ refrigerant compressor according to claim 1.

12. A refrigerator characterized in that it employs the $CO_2$ refrigerant compressor according to claim 1.

13. A hot-water supply machine characterized in that it employs the $CO_2$ refrigerant compressor according to claim 1.

14. A $CO_2$ refrigerant compressor comprising a compression device driven by a bearing-supported rotary shaft, wherein said compression device includes a fixed scroll and a rotary scroll driven by said rotary shaft facing said fixed scroll, and wherein a bearing supporting the rotary shaft comprises a cylindrically-shaped member whose graphite-containing carbonaceous base material has pores impregnated with tin or with one type of metal selected from the IB group or the VIII group, except iron, or with an alloy based on these metals.

15. A $CO_2$ refrigerant compressor according to claim 14, wherein said rotary shaft is supported by said bearing provided at a frame, said rotary scroll is also associated with said bearing fixed to a recessed portion provided in said scroll, and both bearings are formed into a single assembly by press-fitting.

16. A $CO_2$ refrigerant compressor according to claim 14, wherein said member's Shore hardness ranges from 65 to 120.

17. A $CO_2$ refrigerant compressor according to claim 14, wherein said member's compressive strength ranges from 200 to 500 MPa.

18. A $CO_2$ refrigerant compressor according to claim 14, wherein said member's porosity rate ranges from 0.05 to 2.00 volume percent.

19. A $CO_2$ refrigerant compressor according to claim 14, wherein said bearing comprises an alloy containing at least either vanadium or titanium at the rate of 0.2 weight percent or less in either of said metals or in the alloy itself.

20. A $CO_2$ refrigerant compressor according to claim 14, wherein said alloy or either of said metals contains at least either lead or antimony at the rate of 1 weight percent or less.

21. A $CO_2$ refrigerant compressor according to claim 14, wherein said alloy is a copper alloy containing 80–90 weight percent copper, 5–11 weight percent tin, up to 3 weight percent zinc, and up to 1.0 weight percent lead.

22. A $CO_2$ refrigerant compressor according to claim 14, wherein said alloy is a tin alloy containing copper and zinc at rates from 0.5 to 5.0 weight percent and 25 to 35 weight percent, respectively.

23. A $CO_2$ refrigerant compressor according to claim 14, wherein said carbonaceous base material is formed in its final shape.

* * * * *